J. WHEELOCK.
Nuts for Securing Piston-Heads to Piston-Rods.

No. 140,328. Patented June 24, 1873.

Witnesses:
Phil. T. Dodge
G. F. Stenz

Inventor:
Jerome Wheelock
By McLeod
Attorney

UNITED STATES PATENT OFFICE.

JEROME WHEELOCK, OF WORCESTER, MASSACHUSETTS.

IMPROVEMENT IN NUTS FOR SECURING PISTON-HEADS TO PISTON-RODS.

Specification forming part of Letters Patent No. 140,328, dated June 24, 1873; application filed March 27, 1873.

*To all whom it may concern:*

Be it known that I, JEROME WHEELOCK, of the city and county of Worcester, in the State of Massachusetts, have invented certain new and useful Improvements in Head-Nuts for securing Piston-Heads to the Piston-Rods of Steam-Engines.

It is a well-known fact that piston-head nuts, after having been well set up on a piston-head for several months, become so united with the thread on the piston-rod that it is extremely difficult to start them off when the piston is to be removed, and that, in doing so, the outer threads on the rod and nut are, to a greater or lesser extent, liable to be stripped or torn away.

My invention consists in providing the nut with a longitudinal scarf or cut, extending radially from the eye to the outside of the nut, and of sufficient length to admit of its being sprung in a measure free from the surface of the thread whenever it is desirable to remove the nut from the rod; and I do hereby declare that the following specification, taken in connection with the drawings furnished and forming a part of the same, is a clear and true description of my invention, and of several head-nuts embodying the same.

Figure 1:
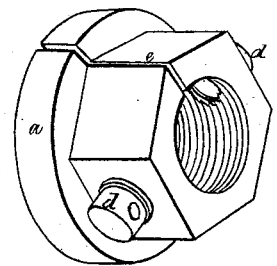
Figure 2:
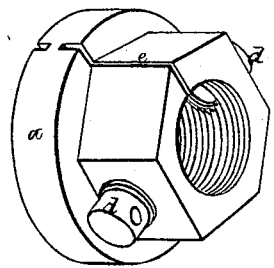
Figure 3:
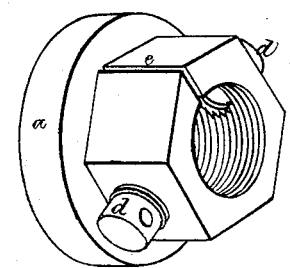
Figure 4:
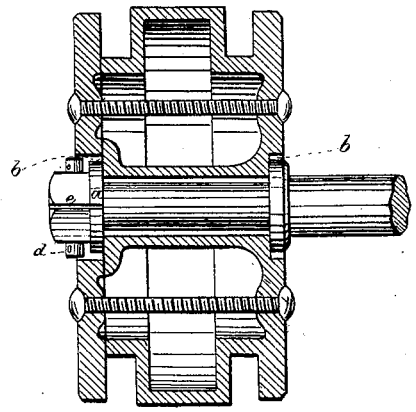
Figure 5:
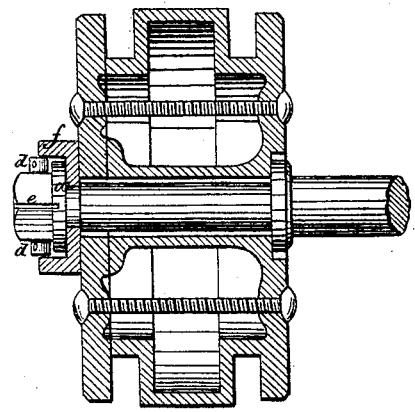

Referring to the drawings, Figures 1, 2, and 3, represent, in perspective, three of my improved head-nuts of slightly-different construction. Fig. 4 represents, in cross-vertical section, a piston-head with my improved nuts in proper position. Fig. 5 represents, in section, a piston-head of a slightly-different character.

I prefer to make the head-nuts, as shown in the drawings, of a hexagonal form, combined with a circular flange, $a$, although the benefits to be derived from my improvement are not confined to nuts of that description. In practice, it is customary to construct the outer faces of the piston-head and follower with an annular recess adjacent to the eye for receiving the piston-rod, as represented at $b$, in Fig. 4. Within the recess $b$ the flange $a$ of the nut freely enters. One or more round-headed set-screws, $d$, are fitted radially in the outer edge of the flange, and are of such a length that they can be set out under pressure into close relation with the circular wall of the recess $b$. The longitudinal scarf or cut $e$ constitutes the distinctive feature of my invention. It will, in all cases, extend from the outer circumference radially to the eye, but the length of the cut may be varied with approximate results. In Fig. 1, the cut $e$ is shown to extend throughout the length of the nut. When so constructed, the set-screws $d$, by contact with the walls of the recess $b$, prevent the nut from spreading, and when it has been properly forced to its position the set-nuts will firmly hold it on the rod. When such a nut is used, it is practicable to start nearly the whole of the entire thread from its contact with the rod; at least all that portion throughout its length which lies adjacent to the cut. To effect the complete loosening of the nut, one long slim wedge will be entered at the end of the cut, and another at the front face of the flange. A slight amount of driving on the wedges thus set, will so spread the nut that it will be thereby well started from the rod throughout the entire length of the thread. It will be seen that the set-screws $d$ will, by contact with the walls of the recess $b$, prevent any undue opening of the cut when the nut is loose enough to be easily turned. In Fig. 2 the slot or cut $e$ is not continuous longitudinally, but extends from the front end of the nut throughout its hexagonal portion, and partially through the flange. Extending from the flange end is another cut coincident with the first, and between the two cuts the flange is of solid unbroken metal. The set-screws $d$ are the same as in the nut already described. To disengage or start such a nut as this the wedge will be driven, as before described, into the cut at the outer end. By spreading the outer end the inner end will be somewhat started, although not to a very noticeable degree. In Fig 3 the flange is represented as if wholly intact, as the slot or cut only extends from the outer end of the nut to the face of the flange. The wedge is applied as with the other nuts. When the nut is to be employed in connection with a piston-head or follower which has no annular recess, and in which it is impracticable to make one, cup-shaped receivers may be loosely fitted on the rod to receive the flange of the nut, sustain the pressure of the set-screws, and afford a backing from which the slotted nut can be firmly set on the rod by means of the set-screws, as illustrated in Fig. 5. When so constructed, the receiver $f$ may be permitted to turn with the nut until it is in contact with the follower, or the receiver may be doweled in its place against the follower and rendered immovable.

It will be seen that with this receiver the nut may be wholly hexagonal or partially so, with or without any flange, and yet afford good results. When the receiver is firmly attached to the follower, the nut, if wholly hexagonal and provided with the set-screws, may be moved forward on the rod until its inner end comes in contact with the face of the recess in the receiver, and then, before any further force is applied to the wrench, the set-screws can be so set out as to prevent any undue opening of the slot, and then the nut can be turned home and firmly set on the rod. It will be seen, if the wedges be no wider than the thickness of the nut between the eye and the sides, that a wrench can be operatively applied to the nut without hindrance from the wedges. In neither of the three instances cited will the operative functions of the nut be impaired. Generally it is only necessary to effect a loosening at the outer end of the nut, and by that means the outer threads may be always preserved intact, however firmly the nut and rod may be united. Should the nut, after being withdrawn, be so far spread as to destroy the outline of the eye, it can readily be restored by hammering it into its original condition. Heretofore great difficulty has always been experienced in starting the nuts on piston-rods, and hence the frequent adjustment of pistons has been habitually neglected until actual necessity has demanded it. With the use of my nut the difficulty is practically obviated, and the desired rotative adjustment of the piston on the rod may be effected easily and frequently with valuable results in the saving of wear on both piston and cylinder.

Inasmuch as the particular character of the slot or cut is not essential if it will admit of the reception of a wedge, and result in the expansion of the nut, it is to be fully understood that I do not confine myself to either of the three kinds shown, as I am well aware that all have merit in so far as they embody the slot or cut, which will admit of their being expanded, and have also means for preventing them from being unduly expanded.

Having thus described my invention, I claim as new and desire to secure by Letters Patent—

A slotted piston-head nut in combination with a device or devices for preventing the expansion of said nut when upon the rod, and for permitting expansion when it is desirable to remove it from the rod, substantially as herein described.

JEROME WHEELOCK.

Witnesses:
CHAS. B. WHITING,
A. GEORGE BULLOCK.